April 24, 1934.   J. SHIBELLI   1,956,180
CANDY MAKING MACHINE
Filed Nov. 4, 1933   2 Sheets-Sheet 1
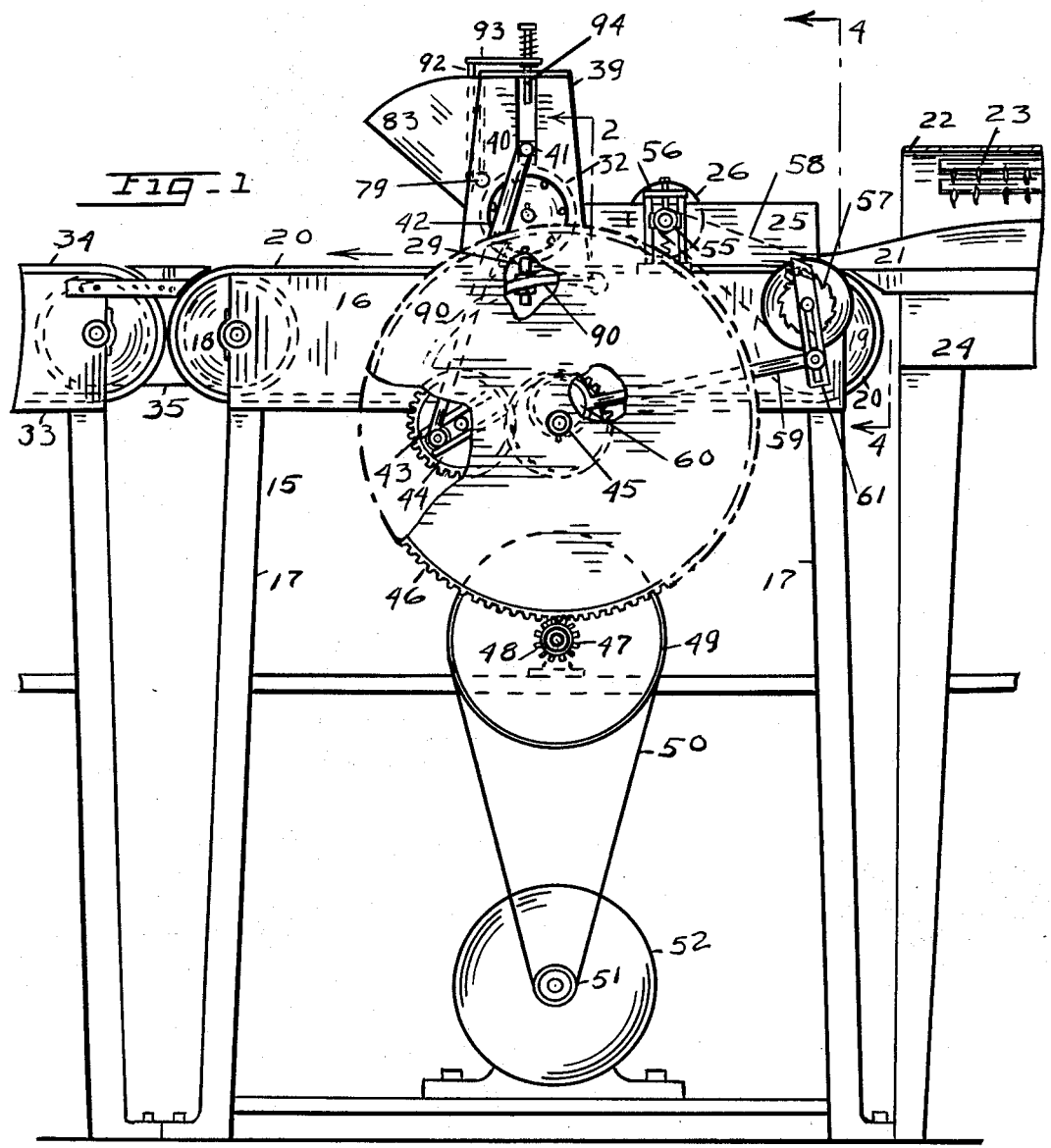
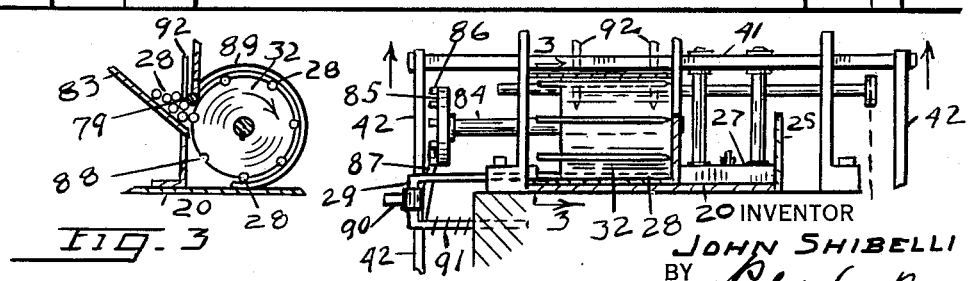

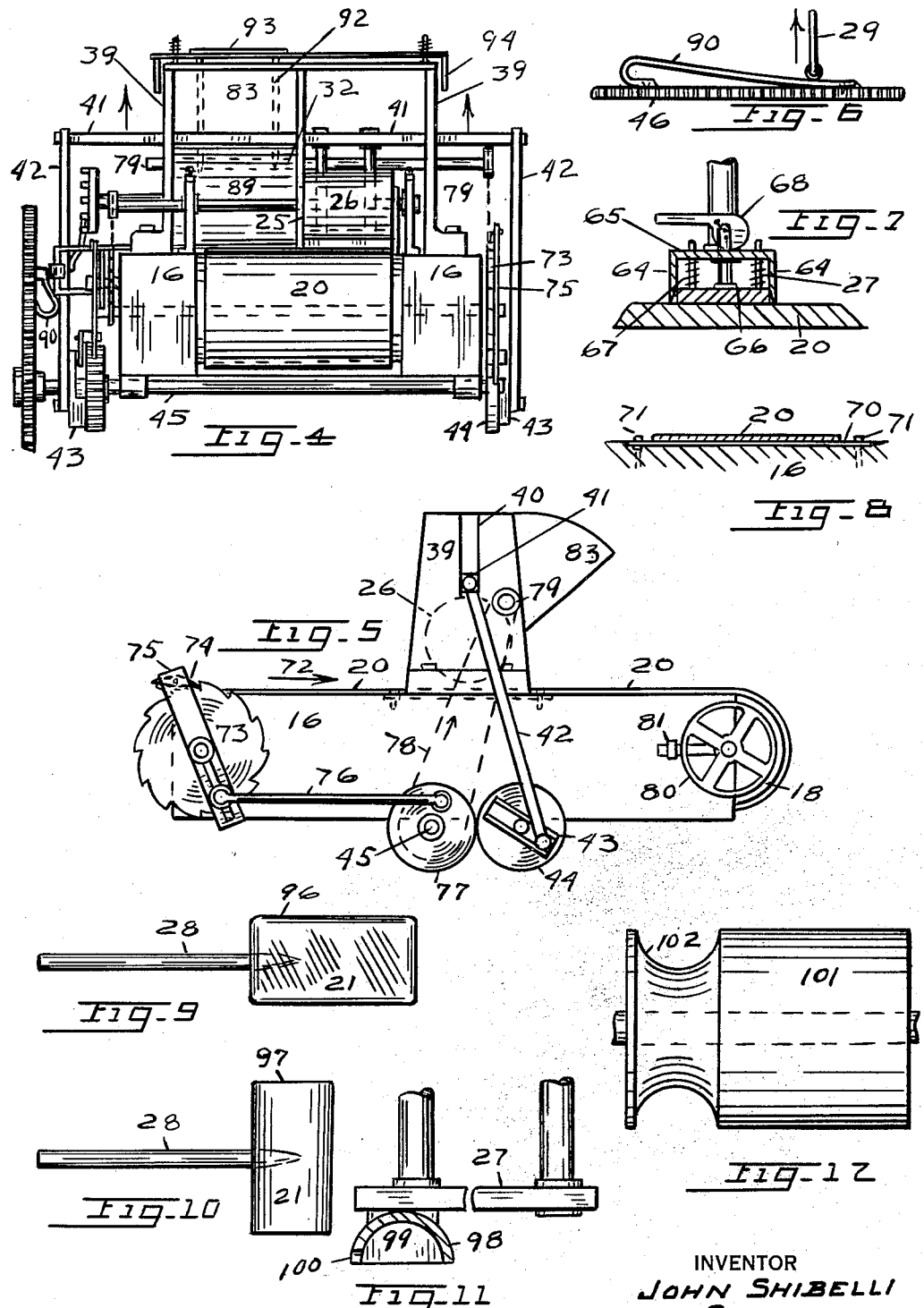

Patented Apr. 24, 1934

1,956,180

UNITED STATES PATENT OFFICE 1,956,180

CANDY MAKING MACHINE

John Shibelli, Brooklyn, N. Y.

Application November 4, 1933, Serial No. 696,603

7 Claims. (Cl. 107—8)

This invention relates to a candy making machine, and more particularly to a machine for the rapid and automatic production of lollipops. Its principal object is to provide a mechanism for cutting and forming the candy and for the insertion therein of sticks, or handle elements.

The machine embodies highly novel and practical means for conveying the candy in a soft, or plastic condition into a position under a cutting and forming die, and means to insert the sticks while the said candy is still firmly held in the die, and means to carry the finished product away in spaced and orderly sequence convenient for handling, packing etc.

The foregoing and other objects and features of the apparatus are fully set forth and described in the following specification and claims, and illustrated in the accompanying drawings in which:

Fig. 1 shows a side view of the machine.

Fig. 2 is a fragmentary section on the line 2 of Figure 1 and shows the stick spacing roller, the stick pusher, and the forming die.

Fig. 3 is a fragmentary section on the line 3—3 of Figure 2, and shows the stick spacing roller and adjacent hopper.

Fig. 4 is an end view of the machine above the line of the main shaft as seen on the line 4—4 of Figure 1.

Fig. 5 is a reverse side view showing the conveyor belt feed mechanism. The general details are omitted in this view.

Fig. 6 is a fragmentary top plan view of the stick pusher cam.

Fig. 7 is an enlarged cross section of a die having an automatic knock out block and an auxiliary release cam.

Fig. 8 is a cross section of the conveyor belt with an adjustable lifting plate set thereunder.

Fig. 9 shows one form of lollipop, enlarged with respect to the scale of the preceding machine views.

Fig. 10 shows another form of lollipop having the appearance of a hammer.

Fig. 11 shows an end view of the forming die in which the hammer shape is produced.

Fig. 12 shows a feed roller having a concentric, contoured groove for delivering the plastic candy mass into the die for the hammer formation.

Referring now to Figure 1 of the drawings; a preliminary description outlines the general character of the machine 15. A table 16 is supported on legs 17. End rollers 18 and 19 are mounted in the frame of the table and a conveyor belt 20 is carried on these rollers. Candy material 21 is heated under the hood 22 which has flames 23 or other heating means, and is mounted on a table 24—these being conventional heating means and merely incidental to the invention. In some cases, candy of a soft variety is used and this is manipulated in a cold condition. The pliable mass 21 is fed into the guide channel 25 by an operator. It is carried along on the conveyor belt 20 and runs under the feed roller 26 which flattens it into the desired thickness. The candy mass now passes, by a series of steps or spaced movements under the die 27—see Figure 2—this die having been lifted by the operating mechanism. The die 27 now descends on the material and cuts it into a suitable form. Into each portion a stick 28 is inserted by means of the pusher element 29. The said stick having been brought into position by the spacing roller 32.

A receiving table 33—see Figure 1— may be set in position as shown, and when so used, another conveyor belt 34 serves to move the oncoming finished lollipops. The belt 34 being driven by the belt connection 35 to the machine proper.

The specific mechanism by which the foregoing operations are performed is as follows:

Referring again to Figure 1, taken in conjunction with Figure 4, it will be seen that side frames 39 are mounted on the table top 16. These frames are vertically slotted at 40 and a cross head bar 41 is liftable in the said slots by means of side links 42 which are operated by pitmen, or cams 43 on disks 44, one of which is in gear mesh with another gear on a main drive shaft 45. The shaft 45—see Figure 1—is operated by the large gear 46 which is in mesh with a pinion 47 on a shaft 48. The shaft 48 is driven by the pulley 49 which carries a belt 50 connected with the pulley 51 of the motor 52. The feed roller 26, over the conveyor belt 20, is flexibly mounted on a shaft 55 set in frame 56, and is operated in a series of short rotating movements by the ratchet wheel 57 and the chain 58, actuated by a pawl on the lever 61. The said lever 61 carries a connecting rod 59 which is driven by a cam 60 on the main drive shaft.

The die 27—see Figure 2—is carried on the cross head 41 and is raised and lowered in a series of timed movements by the links 42. One form of die is shown enlarged in Figure 7. It comprises knives 64 on a head 65. A knock-out block 66 is operated by the springs 67. A cam lifting element 68 provides means for manual operation when desired. The candy is cut by the knives moving down to contact on the conveyor belt 20.

In Figure 8 an adjusting plate 70 rests under the belt 20 and is liftable by the screws 71.

Referring now to the reverse side shown in Figure 5, the timed sequence of movements of the conveyor belt 20 in the direction of the arrow 72 is accomplished by the large ratchet wheel 73 driven by the pawl 74 on the lever 75 which carries the connecting rod 76, which is operated by the pitman disk 77 on the main shaft 45. A sprocket on this disk is connected by the chain 78 to drive the guard roller 79 which will be described later. The pulley 80 is on the shaft of the roller 18 and serves to drive the auxiliary conveyor when one is in use. The adjustment element 81 is for the purpose of taking up the tension on the rollers of the main conveyor belt 20.

The stick distributing mechanism is best seen in Figures 2 and 3. The spacing roller 32 is carried on the shaft 84 which is driven in timed movements by the disk 85 on which studs 86 are moved by the finger 87 which is attached to the lever 42 and rises and falls therewith. The roller 32 has longitudinal grooves 88 and these pick up the sticks 28 from the hopper 83 and carry them around under the guard 89. When a stick reaches a position in line with the die 27, the roller 32 will be in one of its stop pauses and the pusher element 29 will force the said stick over and into the mass of the candy in the die. The pusher element being actuated by a cam 90 which may be seen in Figure 1 on the main drive wheel 46. A spring 91—see Figure 2—retracts the pusher. When the roller 32—see Figure 3—again moves, the stick will be left resting on the conveyor belt 20 which will carry it and the finished candy to the rear. Sticks are prevented from clogging in the hopper 83 by the pins 92 which rise and fall adjacent the guard roller 79, being actuated by the bracket 93—see Figure 1—which has lifter rods 94 which contact on the cross head 41 when it rises.

In Figure 9 a lollipop is shown in the form produced in the machine in its set up as shown in the preceding views. The stick 28 is securely fixed in the head 96 which consists of the candy 21.

In Figure 10 another form of lollipop is shown made in the shape of a hammer and having a head 97. The die for producing this shape is shown in Figure 11. The semi-cylindrical element 98 has cut-off blades as at 99 and a hole 100 at the side for the passage of the stick. When this die is used, a feed roller 101—see Figure 12—is set up in place of the roller 26 originally shown. The contoured groove 102 forms the candy mass and aligns it for passage under the die. Other fanciful forms may be produced by the substitution of properly shaped dies.

The machine is shown and described in its preferred form, but many modifications in construction may be made therein without departing from the spirit and scope of the appended claims.

Having thus described the invention, what is claimed as new and desired to be secured by Letters Patent of the United States, is as follows:

1. In a candy making machine, a supporting frame structure, a conveyor belt operable thereon, side frames on the supporting structure, a cross head bar slidable vertically in the side frames, a die element attached to the said cross head, a drive wheel on a main shaft, the said shaft connected to operate cams which carry side bars to operate the cross head, a cam on the said main shaft connected to operate a ratchet lever which is connected to drive a feed roller in a guide channel over the conveyor belt, another ratchet lever connected to move the conveyor belt and actuated by connection to an element on the main shaft, a stick spacing mechanism adjacent the die, and means to selectively push sticks into formed portions of the candy mass.

2. In a candy making machine, a table, a conveyor belt set over rollers thereon, a main drive shaft and means thereon to actuate ratchet wheels, one of which is connected to move the belt in a series of step movements, and the other to drive a feed roller which is set in a guide channel and acts to flatten and to drive a mass of candy along the said channel, a die set over the conveyor belt and a cross head connected to operate the said die by means of side bars which are connected to cams operable by connection to the main drive shaft, and means to selectively force a series of sticks into formed portions of the candy mass.

3. In a machine of the character described, a supporting frame, a conveyor belt thereon, a die operable in conjunction with the said conveyor, and a stick distributing mechanism adjacent the said die and comprising a spacing roller with facial grooves therein, a shaft keyed in the said roller and a studded disk thereon which is operable in specific movements by means of a lifting finger on a side bar adjacent thereto, a pusher element set in line with the lower peripheral portion of the spacing roller and movable to force a stick therefrom over toward the die, and a cam on a main drive wheel and aligned to actuate the aforesaid pusher element.

4. In a machine of the character described, a stick distributing mechanism comprising a grooved roller adjacent a die and over a conveyor belt, a studded disk on a shaft set to rotate the said roller, and the said disk aligned with a lifting element actuated by connection with a movable side bar, a guide roller bearing against the spacing roller and vertically movable adjusting pins adjacent the said guide roller and actuated by members which contact with a die actuating mechanism adjacent thereto, a guard inclosing a portion of the spacing roller, a pusher element aligned to engage a stick in the lower groove of the spacing roller, and a cam set to actuate the said pusher element and movable by a main drive wheel.

5. In a machine of the character described, a supporting frame, side frames set vertically thereon, a conveyor belt mounted on the said frame and movable in a series of specific steps passing between the said vertical frames, a die element set over the said belt and attached to a cross head which is movable vertically in the side frames and is actuated by side bars which are crank connected to a main drive mechanism, a guide channel set over the conveyor belt and a feed roller in the said channel and operated in correlation with ratchet feed elements which are connected with the said drive mechanism, and means to selectively force sticks from a spacing roller into portions of a candy mass on the conveyor belt.

6. In a machine of the character described, a supporting frame, an endless belt mounted on rollers supported in the said frame, means to adjust the said rollers to tighten the said belt and means to drive the said belt in a series of specific steps to carry a candy mass under a die which is set over the belt and is actuated by a drive mechanism correlated with the belt driving means, a stick spacing mechanism adjacent the said die and means to selectively force sticks therefrom into portions of a candy mass within the aforesaid die.

7. In a machine of the character described, a supporting frame, vertical side frames thereon and a hopper mounted on one side of the machine and adjacent one of the said side frames, a conveyor belt passing between the side frames and means to move the said belt in a series of steps, a die element set over the said belt and supported on a cross head which is vertically movable in the side frames, a spacing roller set to receive sticks from the hopper and to carry them over to a position opposite the die element, means to force the sticks, one at a time, over in the direction of the die, and means to correlatively actuate the conveyor belt and the said cross head and die elements.

JOHN SHIBELLI.